US012005674B1

(12) United States Patent
Kubicek et al.

(10) Patent No.: US 12,005,674 B1
(45) Date of Patent: Jun. 11, 2024

(54) MANUAL KITCHEN TOOL FOR FORMING BAKING LINER

(71) Applicants: Keith R. Kubicek, Batesville, IN (US); Amelia K. Kubicek, Batesville, IN (US)

(72) Inventors: Keith R. Kubicek, Batesville, IN (US); Amelia K. Kubicek, Batesville, IN (US)

(73) Assignee: Boom Millennial, LLC, Batesville, IN (US)

( * ) Notice: Subject to any disclaimer, the term of this patent is extended or adjusted under 35 U.S.C. 154(b) by 0 days.

(21) Appl. No.: 18/183,991

(22) Filed: Mar. 15, 2023

(51) Int. Cl.
*B31D 5/02* (2017.01)
*B30B 9/28* (2006.01)
*B30B 15/02* (2006.01)
*B30B 15/06* (2006.01)

(52) U.S. Cl.
CPC .................. *B31D 5/02* (2013.01); *B30B 9/28* (2013.01); *B30B 15/02* (2013.01); *B30B 15/061* (2013.01)

(58) Field of Classification Search
CPC .. B31D 5/02; B30B 9/28; B30B 15/02; B30B 15/061; A21C 11/004–006; A23P 30/10; B31B 2120/70; B31B 50/44; A21B 3/13–131
USPC ........ 425/318, 303, 403, 398; 249/171, 170, 249/112, 113; 229/406; 220/574; 99/432–451
See application file for complete search history.

(56) References Cited

U.S. PATENT DOCUMENTS

| | | | | |
|---|---|---|---|---|
| 1,073,618 A * | 9/1913 | Henry | B31B 50/44 | 493/152 |
| 1,420,808 A * | 6/1922 | Batdorf | B31B 70/00 | 493/158 |
| 4,026,458 A * | 5/1977 | Morris | B32B 27/10 | 493/902 |
| 2006/0068070 A1* | 3/2006 | Nichols | A21B 3/131 | 426/512 |
| 2008/0015098 A1* | 1/2008 | Littlejohn | B31B 50/592 | 229/406 |
| 2008/0095908 A1* | 4/2008 | Vendl | A21B 3/131 | 426/549 |

FOREIGN PATENT DOCUMENTS

KR 20220014975 A * 2/2022

OTHER PUBLICATIONS

English translation of KR-20220014975-A by EPO. (Year: 2022).*

* cited by examiner

*Primary Examiner* — Michael M. Robinson
*Assistant Examiner* — Inja Song

(57) ABSTRACT

A simple multi-piece manual tool intended for use in a home or small kitchen wherein the tool is used to form baking liner material into a baking liner having flat bottom and fluted sidewalls around the perimeter. The general perimeter of the formed article may be traditional circular as for cupcakes or alternatively a rectangle or some other geometric or non-geometric shape. This baking liner material may be pre-coated with food release agent or colored or have a custom pre-printed pattern or image. Once the baking liner material is formed, the user puts it into a suitable baking pan to be filled with batter or material to be baked or may alternatively use the formed liner as a single serve container.

2 Claims, 16 Drawing Sheets

MANUAL KITCHEN TOOL FOR FORMING BAKING LINER

FIELD OF INVENTION

This invention is a tool which relates generally to food preparation and presentation primarily in a home or small kitchen. It comprises a simple tool which is used to form kitchen baking liner material into a shape having approximately flat bottom and vertically fluted sidewalls. The resultant formed liner would be used in place of retail preformed baking liners. The formed liners typically would be used as either baking pan liners or for a liner in article presentation.

BACKGROUND OF THE INVENTION

Conventional baking of individual serving baked goods such as cupcakes or muffins typically uses retail purchased, fluted paper liners with circular perimeter. These retail baking liners which were first produced sometime after the year 1918 and are currently produced in factories using high volume production machinery. For the average consumer, there is currently no retail kitchen tool for them to form their own fluted liners. So, they purchase these retail packages of factory baking liners which are widely available at retail stores. The purchaser of these liners chooses from the limited color and printed pattern options available on the store shelf. Retail liners with custom printed images may be specially ordered, but at additional cost. Almost all available retail baking liners are traditional circular shape. These retail liners are inexpensive, although a drawback is that baked goods tend to stick to these retail liners, particularly in gluten free baking.

In addition to single serving baking cups, bakers sometimes use a baking liner when making a cake or larger baked item. They may just cut a shape to fit the bottom of their pan, or they use liner material larger than the pan and the weight of the batter pushes the liner material to the bottom of the pan and conforms the liner material to the sidewalls of the pan. The sidewalls of the liner in this instance likely experience excess material which results in random overlapping of the liner material.

As an option to purchased baking liners, home bakers may alternately use a suitable size drinking cup and manually form liner material around it. Bakers use the drinking cup as a 'mold'. This manual forming has somewhat inconsistent results and portions of the vertical walls overlap which partially or wholly distort or hide desired images pre-printed on the vertical sides of the liner. In this method, dimensions of the formed liner may be too large or too small depending upon user's available drinking cup size.

SUMMARY OF THE INVENTION

The unique invention herein improves the food preparation experience by providing a simple kitchen tool which is used to consistently form fluted baking liners out of the user's choice of baking liner material, (i.e., baking parchment paper, Quilon liner, wax paper, aluminum foil, etc.). This invention is used to form kitchen baking liner material into a liner shape having approximately flat bottom and vertically fluted sides around the perimeter. In addition to traditional circular perimeter baking cups, embodiments of this invention may be constructed wherein the fluted perimeter of the liner material is formed to a non-circular shape such as diamond or rectangle or heart or some other fun or geometric or non-geometric shape. This invention also provides the user with the option to customize or individually pre-color or decorate the liner material prior to forming.

BRIEF DESCRIPTION OF THE DRAWINGS

The drawings accompanying and forming part of this specification are included to depict aspects of the invention and are not deemed to be all-inclusive. A person versed in the art may design a similar tool which appears different yet performs this same function. Embodiments illustrated in the drawings refer to the exemplary, and therefore nonlimiting, where like numerals are used to refer to like. The features illustrated in the drawings are not necessarily drawn to scale.

It is noted that the unformed liner material represented in the drawings is illustrated as circular or rectangular, but that is entirely the discretion of the user. They may decide to cut a circular shape or fanciful shape or simply tear the liner to approximate size.

FIG. 13 illustrates the condition where the flexible portion is forming the outside surface of the liner.

FIG. 15 also shows a representation of the final formed liner material.

INVENTION DESCRIPTION AND OPERATION

This invention specification describes five implementations. The formed liner resulting from each implementation of the invention is similar, although there are some variations in resulting liner material perimeter dependent upon which implementation is used. The resultant baking liner has roughly flat bottom and fluted sidewalls. It may have circular or some other perimeter such as, but not limited to rectangular, elliptical, heart shape, etc. The invention may be scaled in size larger or smaller depending upon the desired size of the finished liner. In addition, for a given size tool of this invention, the user may vary the liner's sidewall height by using larger or smaller pieces of baking liner material.

Overview of the implementations of the invention presented herein:

1. Two-piece tool with single operation; top forming tool and bottom forming tool.
1. a Two-piece tool similar to 1. wherein the diameter is larger to form a liner for a pan or dish.
2. Two-piece tool, but the upper pusher tool is used one way to preform the liner, then inverted to push the liner material into the bottom tool resulting in the final formed liner material.
3. Three-piece tool with bottom tool, a preform tool and a push-thru tool.
4. Two-piece tool wherein the top pusher tool is initially wider to partially form the liner material. During use, the pusher is pushed into the rigid bottom tool, which causes the pusher to flex inward to become smaller diameter while forming the final shape of the liner material.
5. Three-piece tool where the bottom tool piece forming the outside perimeter of the liner material flexes inward, forming the liner material against the rigid pusher tool forming the inside profile of the liner material.

Detailed Tool Operation and Description:

Images representative of described forming methods generally illustrate traditional circular profile of the liner material, but in all these embodiments, the baking liner material may be formed to a non-circular perimeter profile such as a rectangle, oval or ellipse, heart etc.

Figure 1:
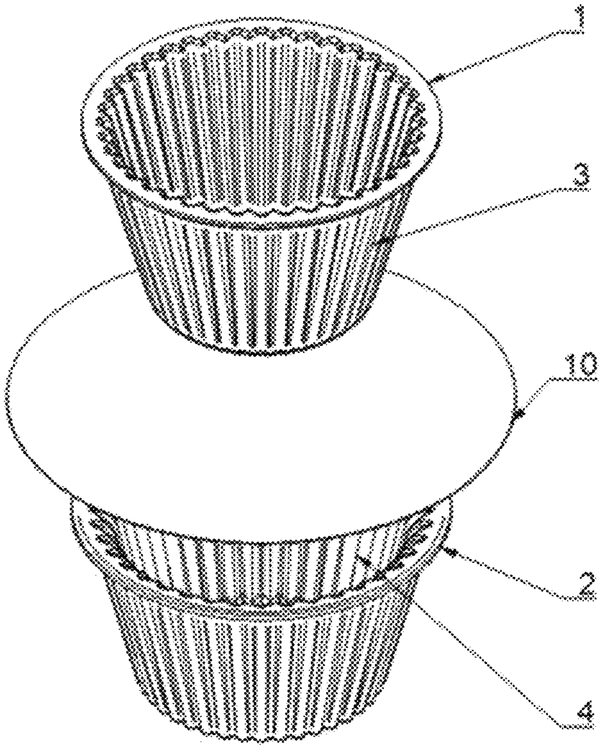
FIG. 1 illustrates a two-piece implementation of this invention showing top tool, bottom tool and a representation of baking liner material in position to begin forming. The view shows a tool which forms a baking liner similar to a traditional circular perimeter. Inclusive in this invention is a tool which functions similarly to form the liner material to an alternate final profile with flat bottom and fluted sidewalls such as rectangle, heart, ellipse, etc.

1. Two-piece tool with single operation represented in FIG. 1 & FIG. 2. In this embodiment of the invention, there are two parts of the forming tool. A top tool 1 and bottom tool 2. FIG. 1 shows representative baking liner material 10 roughly positioned on the bottom tool 2 prior to forming.

Describing the physical tool in this embodiment, the outside perimeter of the top tool 1 is in the form of a truncated cone with vertical ribs 3 spaced around the outside perimeter as illustrated in FIG. 1. The bottom tool 2 is similarly a truncated cone, with forming ribs 4 on the inside perimeter. The interface between the ribs 3 and 4 is designed to flex the liner material to form and retain the desired final profile. It is noted that specific tool surface profiles and dimensions of both the top tool 1 and bottom tool 2 are determined either by mathematical analysis or trial and error or some combination thereof.

Employing this embodiment to form baking liner material, the user employs hand pressure to push the top tool 1 against the unformed liner material 10 as illustrated in FIG. 1. User pushes the top tool 1 fully into the bottom tool 2. Compressing the top tool 1 into the bottom tool 2 conforms the liner material between the ribs 3 and 4 on the two tools. This forces the liner to conform to the ribs 3 and 4. The user then uses their fingers to remove the top tool 1 out of the bottom tool 2. User then uses their fingers to remove the formed liner material 30. This formed baking liner 30 is then placed into a cupcake or muffin baking pan and filled with the desired material for baking or the formed liner 30 is used as a single use serving container, (perhaps party nuts, samples, mints, etc).

Figure 2:
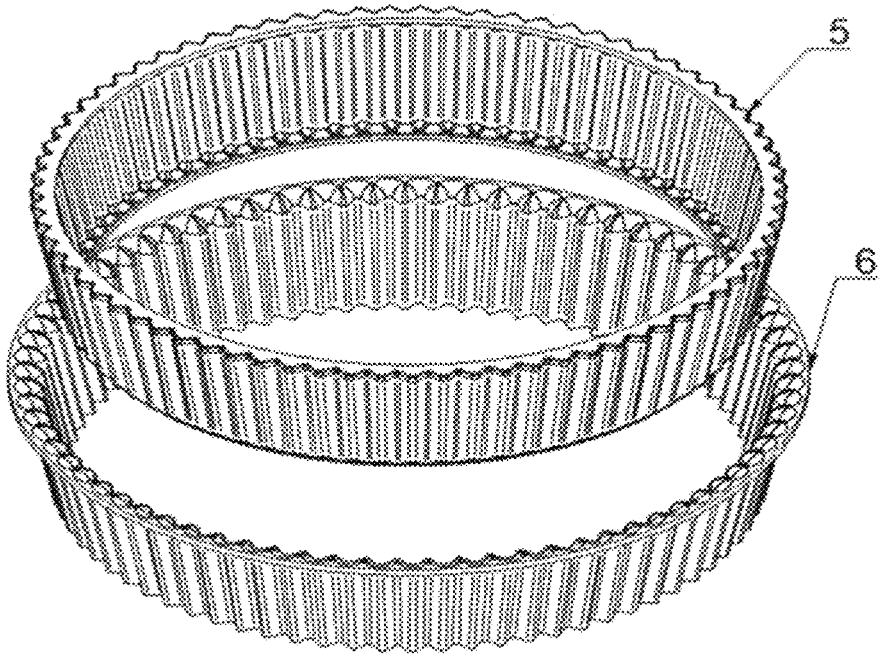
FIG. 2 is an illustration of a two-piece implementation similar to that shown in FIG. 1, however FIG. 2 embodies a larger diameter which forms liner material as for a circular baking pan or pie pan. This tool can also be designed such that it forms a rectangular liner or other perimeter profile as desired.

1a. Exemplary scaled version of two-piece tool represented in FIG. 2 illustrates said two-piece tool comprising a top tool 5 and bottom tool 6. This embodiment has physical description as above for two-piece tool and is not repeated here. This embodiment is scaled to a larger diameter to form a liner for a circular baking pan or pie pan or as a liner for a dish of some sort. This scaled liner forming tool would be sized to form the liner material to appropriate diameter and wall height for the desired pan or dish. This tool may alternatively be designed to a rectangle or other shape befitting the desired receptacle. Using the tool is the same as described in 1, above for a similar two-piece tool.

Figure 3:
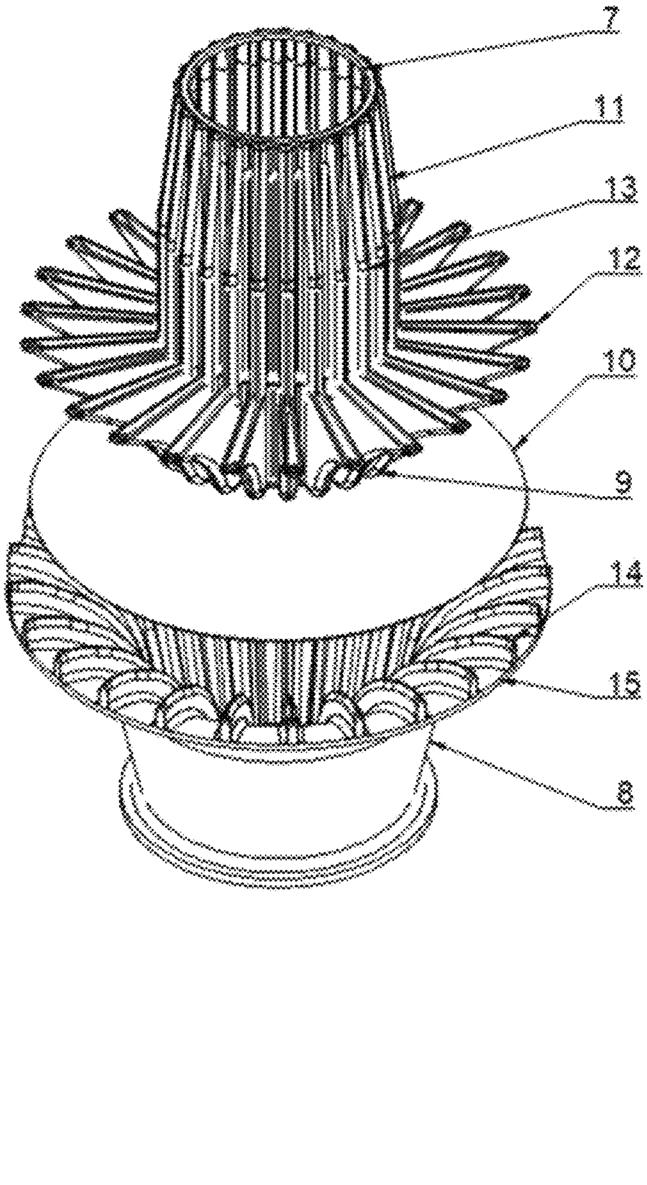
FIG. 3 is an illustration of a different implementation of a two-piece tool wherein the top tool has a side A, and a side B. Side A is used to initially preform the liner material and side B is used to push the liner material into the bottom tool where together they form the liner material into the final shape. As with other implementations of this invention, this implementation can be designed to form liner material with a perimeter which is other than circular.
Figure 4:
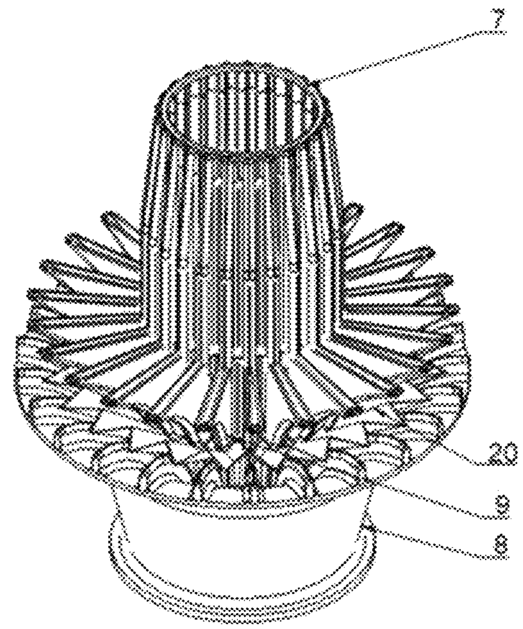
FIG. 4 is an illustration of the implementation in FIG. 3 using top tool side A to begin forming flutes or 'preform' the liner material.

2. Two-piece tool with one piece of the tool used to perform two operations illustrated in FIG. 3, FIG. 4 and FIG. 5. In this embodiment of the tool the top tool 7 has two functional sides, side A 9 and side B 11. FIG. 3 is representative of this implementation of the invention with the unformed baking liner material 10 centered on the bottom tool 8 prior to forming.

Describing the physical tool comprising this embodiment, the top tool 7 is roughly a truncated cone with a side A 9 and side B 11. Each side has vertical ribs 12 & 13 around the outside profile. The ribs 12 on side A 9 are at a wide angle suitable for initial preforming of the liner material 10 against the ribs 14 of the bottom tool 8. Side B 11 of the top tool 7 similarly has raised ribs 13, however they are at a much steeper angle for properly forming the final profile of the liner material 30 against the ribs 14 of the bottom tool 8. The bottom tool 8 is a hollow funnel shape and has vertical raised ribs 14 (or raised surfaces) on the inside perimeter. These ribs 14 on the bottom tool 8 interface with the top tool 7 to form the final profile of the liner material 30. FIG. 3 shows representative raised ribs 14 on the inside diameter of the bottom tool 8. There are many other potential profiles for the 'valley' area 15 between ribs 14 of the tool 8. Many valley 15 shapes of the tools could be used to properly form the liner material, as long as the top, forming surface of the ribs 14 (or raised surfaces) properly engages the liner material while interfacing with the top tool 7. To achieve formation of the desired final profile of the liner material 30, specific tool surface profiles and dimensions of the tool pieces are determined either by mathematical analysis or trial and error or some combination.

To use this tool resulting with the formed baking liner material 30, the user centers the unformed liner material 10 on bottom tool 8. Then user takes the top tool 7 and approximately centers side A 9 on the liner material 10 which is resting on the bottom tool 8. User presses with hand force on top tool 7 side A 9 against the liner material 10 resting on top the bottom tool 8. This serves to preform the liner material 20. User may need to wiggle or slightly rotate top tool 7 side A 9 approximately +/−5 degrees to get top tool 7 side A 9 to make a preform of the baking liner material 20. Representation illustrated in FIG. 4.

Figure 5:
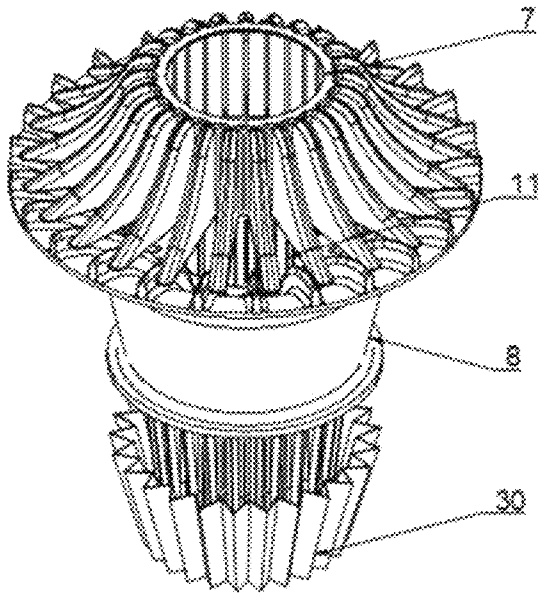
FIG. 5 is an illustration of the final stage of forming the liner material using the implementation in FIG. 3 and FIG. 4.

User then keeps the preformed liner material 20 in preformed position on the bottom tool 8 while lifting and inverting the top tool 7 to side B 11. User then places top tool 7 side B 11 against the preformed liner material 20. User approximately aligns ribs 13 of the top tool 7 side B 11 with the indented, preformed liner material 20. User presses the top tool 7 side B 11 against the preformed liner material 20, then pushing it into the bottom tool 8. As the top tool 7 side B 11 is pressed into the bottom tool 8, the ribs 12 and valleys of the top tool 7 will tend to self-align with the ribs and valleys on the bottom tool 8 for proper final forming of the liner material 30. Dependent upon the way tool is designed to operate, user may need to continue pushing the top tool 7 side B 11 into the bottom tool 8, eventually lifting the whole assembly from the flat surface. In this case, the user would continue pressing the top tool 7 side B 11 through the bottom tool 8 until the final formed liner material 30 comes out the bottom of the whole assembly. This is represented in FIG. 5.

Figure 6:
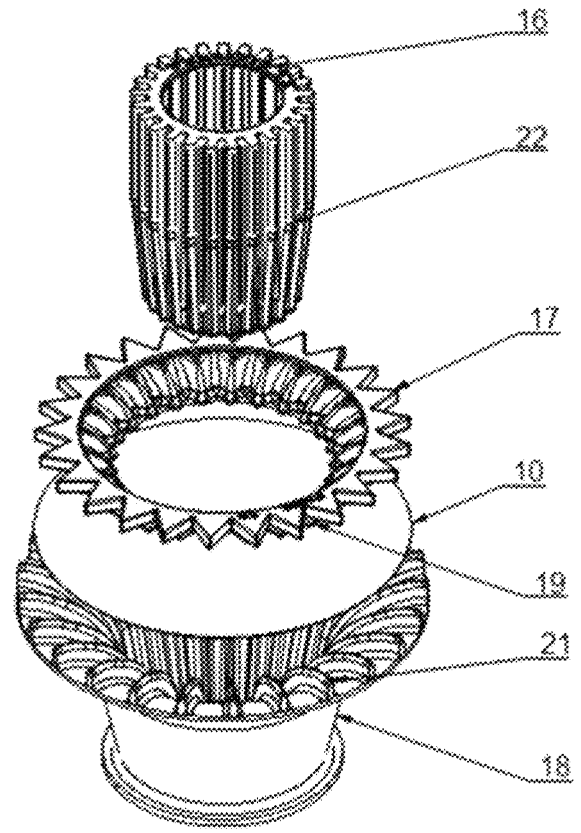
FIG. 6 is an illustration of a three-piece implementation of this invention. As with the other implementations, this also may be designed to form liner material with a perimeter other than circular.

3. Three-piece tool represented in FIG. 6, FIG. 7, FIG. 8, and FIG. 9. In this implementation of the invention, there are three separate pieces comprising the tool. The preform tool 17, the bottom tool 18 and the pusher tool 16. FIG. 6 shows a representative exploded view of the three pieces of this embodiment with unformed liner 10.

Describing the physical tool in this embodiment, the preform tool 17 is roughly disc shape with radial ribs 19 around the underside perimeter of the tool 17. These ribs 19 are sized and spaced to correspond with the forming ribs 21 on the bottom tool 18. The ribs on the preform tool 17 are angled downward from horizontal so as to conform to the lead-in on the ribs 21 of the bottom tool 18. Material on the preform tool 17 between these ribs 19 is removed so as to allow the flutes of the preformed liner material 20 to flex upward during preform and subsequent forming operation. The top tool 16 is the approximate shape of a truncated cone having vertical ribs 22 around the outer circumference which align between the ribs 21 on the bottom tool 18 and also align to the inside diameter of the preform tool 17. The bottom tool 18 is a hollow funnel shape and has raised ribs 21 conforming to the preform tool 17 and top tool 16 which form the liner material 10. The specific profiles of the ribs 22, 19, and 21 are determined through mathematical analysis or by trial and error or through some combination.

Figure 7:
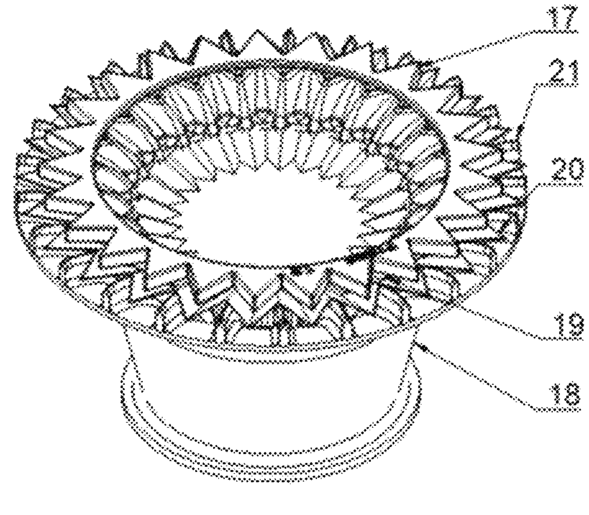
FIG. 7 is an illustration of the implementation of FIG. 6. This view shows the first step in forming, the press tool is being used to preform the liner material.

To use this implementation of the invention to form the liner material, the user places the bottom tool 21 on a flat surface with the desired un-formed liner material 10 centered on top. User next places the preform tool 17 approximately centered on top of the liner material 10 which is resting on the bottom tool 18. User presses downward on the preform tool 17 to start forming the liner. User may need to wiggle or rotate pre-form tool 17 +/−5 to 10 degrees while simultaneously pressing downward to get the preform tool 17 to make the preform of the liner material 20. By design, the preform tool 17 will self-orient to the raised ribs on the bottom tool 13. A representation of this is shown in FIG. 7.

Figure 8:
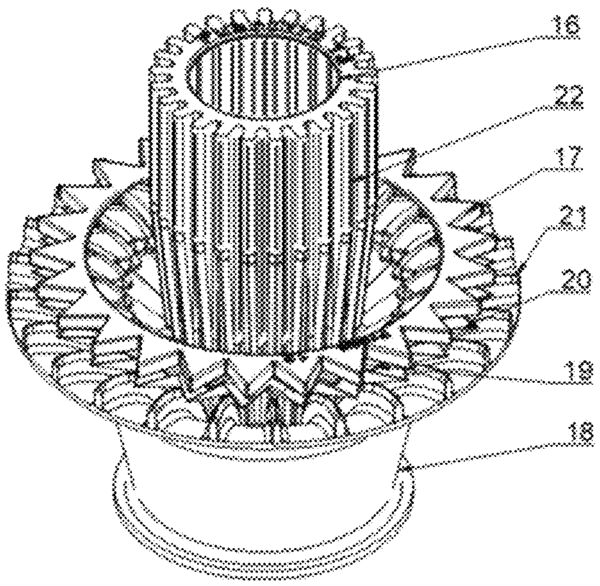
FIG. 8 is an illustration of the implementation of FIG. 6, and FIG. 7. This view shows the next step in forming the liner material. The top tool is in position to begin pushing liner material through the preform tool and into the bottom tool.

User continues holding the preform tool 17 in place on the bottom tool 18 along with the preformed liner 20. User places the pusher tool 16 in the center of the preformed liner material 20. The pusher tool 16 will align to the inside perimeter of the preform tool 17. At this point in the process, both preform tool 17 and preformed liner material 20 are resting on the bottom tool 18. User pushes downward on the pusher tool 16, continuing with downward force on the preform tool 17. As the pusher tool 16 presses the preformed liner material 20 into the bottom tool 18, the ribs on the pusher tool 16 will self-orient to the inside diameter of the preform tool 17 and also to the ribs on the bottom tool 18. This is represented in FIG. 8. The interfacing ribs of the pusher tool 16 and the bottom tool 18 act to conform form the pliable liner material to the desired shape.

Figure 9:
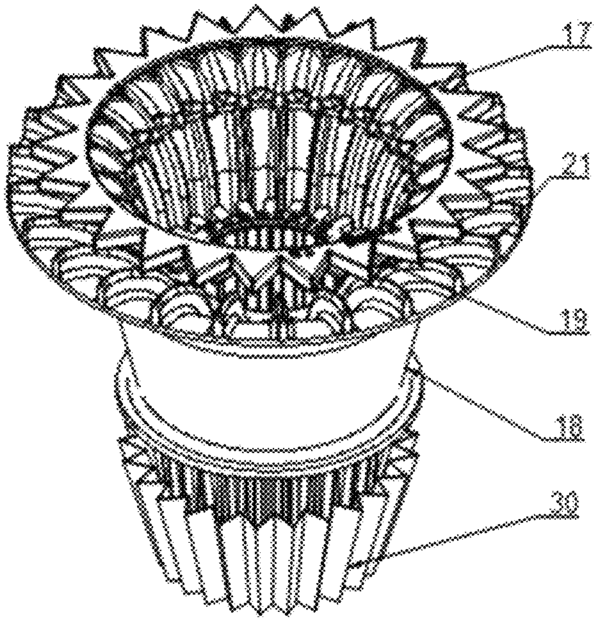
FIG. 9 is an illustration of the implementation of FIG. 6, FIG. 7 and FIG. 8. However, this view illustrates the case where the formed liner is pushed out the bottom of the tool assembly.

Depending upon the design of this implementation, once the pusher tool 16 is pressed downward until it touches the flat surface, user may need to lift the whole assembly while continuing to push the pusher tool 16 through the bottom tool 18 until the formed liner 30 is pushed out the bottom of the assembly. This is represented in FIG. 9.

4. Flexible pusher tool embodiment represented in FIG. 10, FIG. 11 and FIG. 12. This embodiment is presented with two possible options utilizing a flexible pusher tool 23 or 24 represented in FIG. 10. One with ribs 26 which flex inward and another with flutes 29 which are made with flexible hinges 35 which enable the tool to flex. These are not presented as an inclusive list of possible embodiments of the implementation. Both produce the same result which is formed baking liner material.

Figure 10:
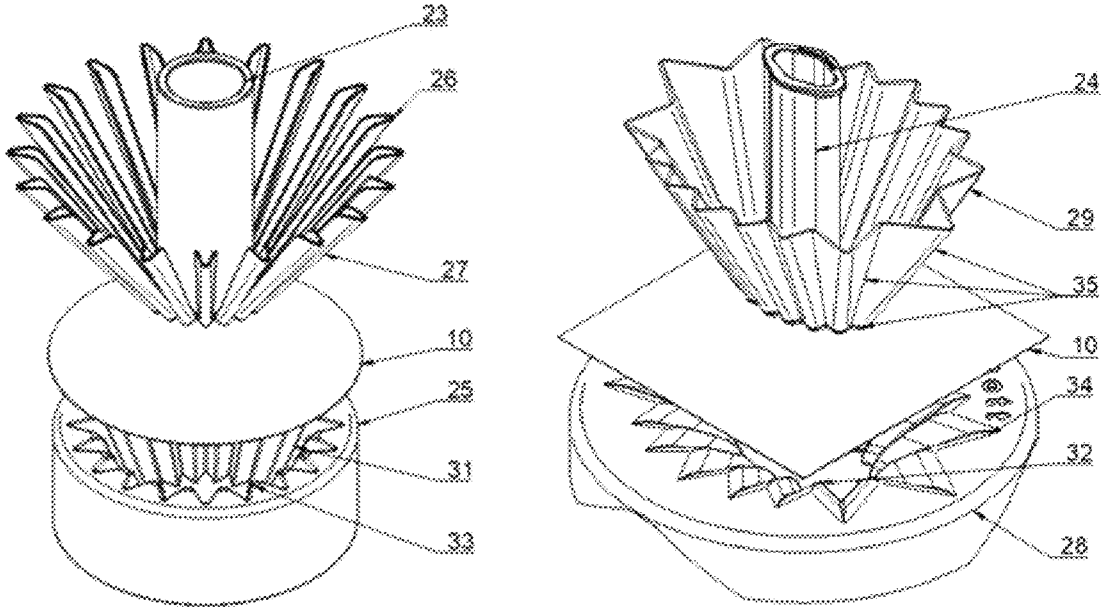
FIG. 10 is an illustration of isometric assembly views representative of two interpretations of the same implementation. As with the other implementations, these also may be designed to form liner material with a perimeter other than circular.

Describing the physical tool comprising this embodiment, the pusher tool 23 is a truncated cone with separated ribs 26 vertically around the outside perimeter. These ribs 26 have a flexible hinge 27 where each rib 26 connects to the middle part of the top tool 23. In the other option, the pusher tool 24 is a slightly different design wherein the vertical ribs 29 are connected to each other and to the middle part of this top tool 24 by some sort of hinges 35. There are many possible configurations of each bottom tool 25 or 28. Representations of two possible configurations are illustrated in FIG. 10. The configuration of the bottom tools 25 or 28 are designed to properly interface with the top tools 23 or 24. This bottom tool 25 or 28 is constructed with vertical ribs 31 or 32 around the interior circumference. This bottom tool 25 or 28 is flared outward at the top 33 or 34 to facilitate proper lead-in for the liner material 10 during initial forming.

Figure 11:
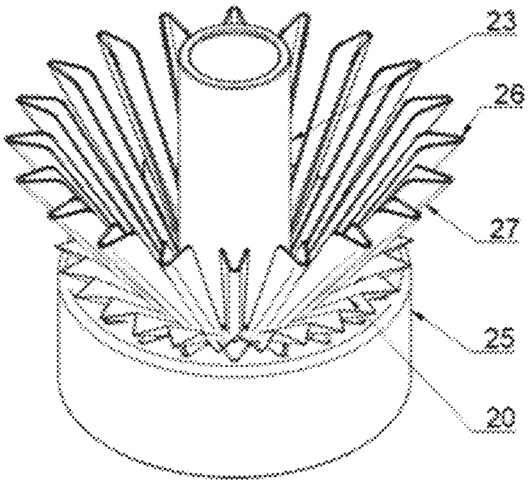
FIG. 11 is an illustration of one of the implementations from FIG. 10 as it is used to begin to form liner material.
Figure 12:
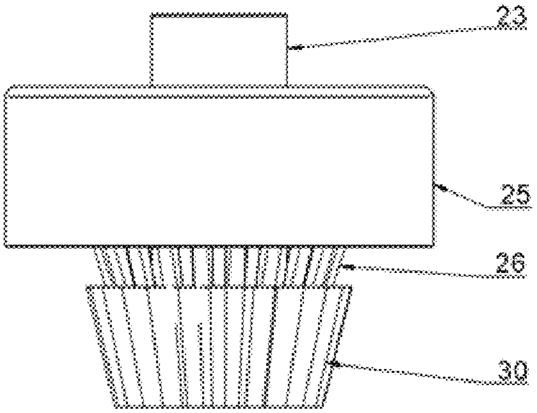
FIG. 12 is an illustration of the case where the formed liner is pushed out of the bottom of the implementation of FIG. 11.

To use this embodiment, user would place the bottom tool 25 or 28 on a flat surface. User then places the baking liner material 10 approximately centered on top. User then places the corresponding pusher tool 23 or 24 approximately centered on top of the liner material 10 which is resting on top of the bottom tool 25 or 28. User then begins pushing the pusher tool 23 or 24 downward, into the liner material 10 and hence into the respective bottom tool 25 or 28. This will start forming the liner material 20 as represented in FIG. 11. As the pusher tool 23 or 24 is pushed further against the liner material 20 into the bottom tool 25 or 28, the pusher tool 23 or 24 flexes upward and inward forming a smaller diameter. As the pusher tool 23 or 24 is flexing to smaller diameter, it is aligning to the flutes in the bottom tool 23 or 24 beginning to form the liner material 20. This is represented in FIG. 11. Depending upon the specific design of the tool pieces, the liner may be completely formed when the pusher tool 23 or 24 reaches the flat surface, or the pusher tool 23 or 24 may need to push completely through the bottom tool 25 or 28. Represented in FIG. 12 is the case where the pusher tool 23 or 24 pushes completely through the bottom tool 25 or 28.

Figure 13:
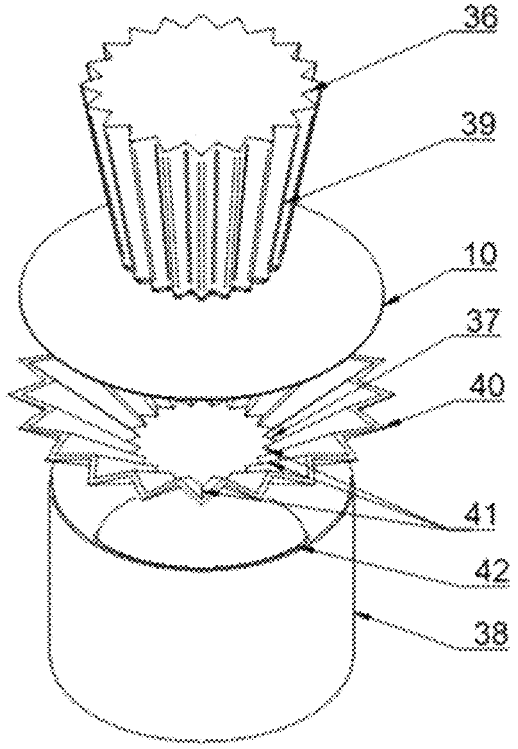
FIG. 13 is an illustration of another implementation of the invention. In this implementation, the tool piece forming the outside of the liner material flexes upward and inward as it forms the liner material. In this implementation, the tool forming the inside surface of the liner material is rigid. Similar to FIG. 10 except

Note that the tool with flexible sections represented in FIG. 10 and FIG. 13 may also be designed using some type of spring arrangement to apply outward force to the ribs 26 or 29. (Spring arrangement not illustrated in this specification).

5. Flexible middle tool embodiment represented in FIG. 13, FIG. 14 and FIG. 15. This embodiment comprises three pieces. A top tool 36, a flexible middle tool 37 and a base 38. Unique in this embodiment is that the flexible middle tool 37 forms the outside perimeter of the liner material 10 through the action of the exterior ribs 40 flexing upward and inward through the action of pressing the flexible middle tool 37 into the base 38.

Describing the physical pieces comprising this embodiment, the top tool 36 is a truncated cone having vertical ribs 39 around the perimeter of the outside. The flexible middle tool 37 is a truncated cone with ribs 40 around the inside perimeter. The ribs 40 in the flexible middle tool 37 may be pointed as shown in the representative figures or rounded or another profile which properly flexes to form the liner material 10. The flexible middle tool 37 has thin sidewalls or some other configuration to allow the flexible ribs 40 to move inward and upward as they form the liner material 10. The flexible middle tool 37 ribs 40 comprise hinged seams 41 which flex or bend. This allows the ribs 40 to have relative motion during tool use. The base 38 is a hollow cylinder comprising a chamfer or radius or some combination which forms the top inside perimeter. In use, the interior, curved top of the base 38 acts against the outside of the ribs 40 of the flexible middle tool 37, compressing the ribs 40 which interface with the ribs 39 on the top tool 36 to form the final shape of the liner material 30.

Figure 14:
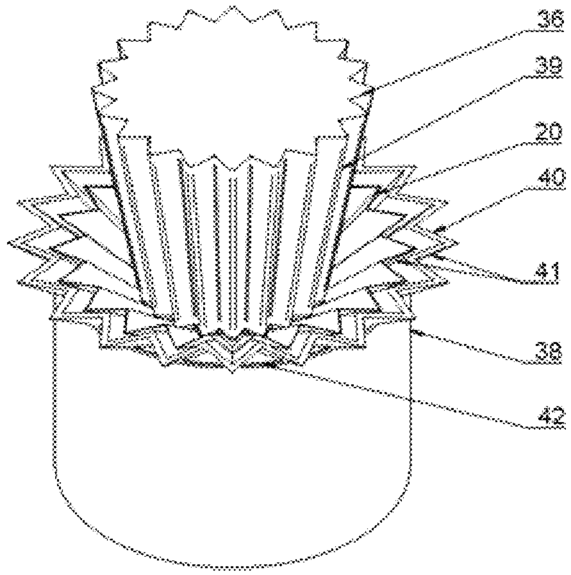
FIG. 14 illustrates using the tool in FIG. 13 wherein forming is starting and the tool piece forming the outside of the liner is beginning to flex inward and upward.
Figure 15:
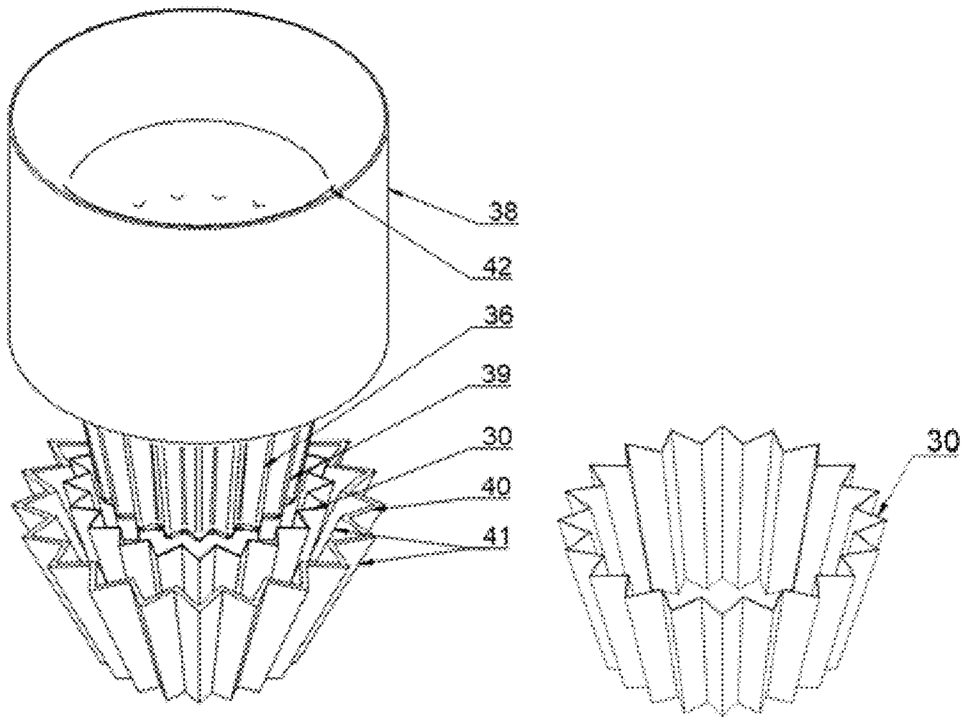
FIG. 15 illustrates the tool in FIG. 13 and FIG. 14 wherein the tool forming the inside of the liner is pressed completely.
Figure 16:
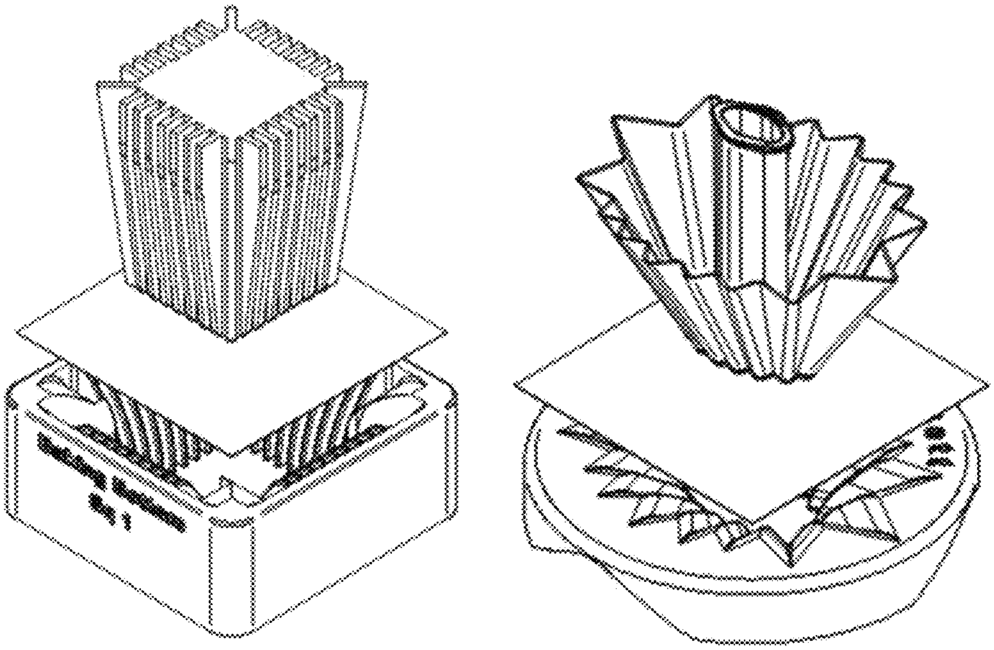
FIG. 16 illustrates exemplary of two proposed embodiments of geometries for tools which form perimeters other than circular. The tool represented on the left is indicative of a tool forming a rectangular liner and the tool on the right is indicative of a tool forming an elliptical perimeter liner. There are other possible perimeter profiles, so these are not a limiting representation of all possible forming tool shapes.

To use this embodiment of the invention the user places the base 38 on a flat surface. Next the user places the flexible middle tool 37 approximately centered on the base 38. Then the user places the unformed liner material 10 approximately centered on the flexible middle tool 37. The user then places the top tool 36 approximately centered on the liner material 10. This step is represented in FIG. 14. The user then starts pressing the top tool 36 into the liner material 10 and into the flexible middle tool 37. The flexible middle tool 37 and top tool 36 may have a feature to assist aligning the ribs 39 on the top tool 36 to the ribs 40 on the flexible middle tool 37. (Alignment feature not represented in the drawings). As the top tool 36 pushes against the liner material 10 and the flexible middle tool 37, the flexible middle tool 37 starts forming the liner material 20. As the top tool 36 interfaces with the flexible middle tool 37 and is pressed all the way into the base 38, the ribs 40 of the flexible middle tool will have flexed inward, thus forming the exterior of the liner material. Depending upon the tool designed for this embodiment, the liner may be complete at this point, or the top tool 36 may have to push the liner material 10 and flexible middle tool 37 completely through the base 38.

While particular embodiments and applications of this disclosure have been illustrated and described, it is understood that the scope of this disclosure is not limited thereto. A person skilled in the art could make modifications without deviating from the scope of the present disclosure. One could make additions or subtractions such that these other embodiments of this same invention could be configured or operated differently than the illustrative examples presented herein. However, the result is the same as presented here, liner material 30 formed in the shape of a baking liner.

What is claimed is:

1. A manually operated kitchen tool comprising:

a rigid first part comprising a hollow interior and a plurality of ribs;

a second part comprising a plurality of ribs, wherein the plurality of ribs of the second part is flexible or hinged;

wherein a liner material and the second part are pushed into the hollow interior of the first part; and wherein the plurality of ribs of the second part engages with the plurality of ribs of the first part and flexes or hinges upward and inward to shape the liner material between the plurality of ribs of the first part and the plurality of ribs of the second part so as to have an outside perimeter profile with a flat bottom and fluted sidewalls.

2. A manually operated kitchen tool comprising:

a rigid first part comprising a hollow interior;

a second part comprising a plurality of ribs, wherein the plurality of ribs of the second part is flexible or hinged;

a rigid third part comprising a plurality of ribs;

wherein the second part, the third part, and a liner material between the second part and the third part are pushed into the hollow interior of the first part; and wherein the plurality of ribs of the second part engages with the plurality of ribs of the third part and flexes or hinges upward and inward into the first part to shape the liner material between the plurality of ribs of the second part and the plurality of ribs of the third part so as to have an outside perimeter profile with a flat bottom and fluted sidewalls.

* * * * *